United States Patent
Hsu

(10) Patent No.: US 12,540,699 B2
(45) Date of Patent: Feb. 3, 2026

(54) QUICK COUPLER

(71) Applicant: FOSITEK CORPORATION, New Taipei (TW)

(72) Inventor: An-Szu Hsu, New Taipei (TW)

(73) Assignee: FOSITEK CORPORATION, New Taipei (TW)

( * ) Notice: Subject to any disclaimer, the term of this patent is extended or adjusted under 35 U.S.C. 154(b) by 0 days.

(21) Appl. No.: 18/668,885

(22) Filed: May 20, 2024

(65) Prior Publication Data

US 2025/0347377 A1    Nov. 13, 2025

(30) Foreign Application Priority Data

May 10, 2024 (TW) .................................. 113117458

(51) Int. Cl.
  *F16L 37/23*    (2006.01)
  *F16L 37/34*    (2006.01)

(52) U.S. Cl.
  CPC .............. *F16L 37/23* (2013.01); *F16L 37/34* (2013.01)

(58) Field of Classification Search
  CPC .................................. F16L 37/23; F16L 37/34
  See application file for complete search history.

(56) References Cited

U.S. PATENT DOCUMENTS

| | | | | |
|---|---|---|---|---|
| 2,708,589 | A | * 5/1955 | Masek | F16L 37/23 251/149.6 |
| 4,289,164 | A | * 9/1981 | Ekman | F16L 37/23 137/614.03 |
| 5,240,023 | A | * 8/1993 | Shelef | F16L 37/38 251/149.6 |
| 6,371,443 | B1 | * 4/2002 | Imai | F16L 37/35 137/614.04 |

(Continued)

FOREIGN PATENT DOCUMENTS

| CN | 107906289 A | * 4/2018 | ............. F16L 37/23 |
|---|---|---|---|
| CN | 112984252 A | 6/2021 | |

(Continued)

OTHER PUBLICATIONS

Search Report dated Jan. 9, 2025 issued by Taiwan Intellectual Property Office for counterpart application No. 113117458.

*Primary Examiner* — David Colon-Morales
(74) *Attorney, Agent, or Firm* — Demian K. Jackson; Jackson IPG PLLC

(57) ABSTRACT

A quick coupler includes a male part externally provided with a radially protruded portion having a slanted pushing surface and a chamfered locating surface, and a female part provided with two circular rows of staggered first and second through holes for receiving first and second steel balls therein, respectively. The female part includes a front and a rear female case and an outer sliding sleeve slidably fitted on the front female case and a spring located outside the front female case. When connecting the male to the (Continued)

female part, the protruded portion sequentially pushes the staggered first and second steel balls, which in turn drive the outer sliding sleeve rearward to an unlocking position. When the first steel balls are moved to the locating surface, the outer sliding sleeve is pushed by the spring to press against the steel balls and firmly lock the female part to the male part.

7 Claims, 7 Drawing Sheets

(56) References Cited

U.S. PATENT DOCUMENTS

| | | | | |
|---|---|---|---|---|
| 6,681,803 | B2* | 1/2004 | Taneya | F16L 37/23 251/149.6 |
| 6,779,778 | B2* | 8/2004 | Kuwabara | F16L 37/46 285/86 |
| 7,213,845 | B2* | 5/2007 | Sato | F16L 37/34 285/85 |
| 7,661,725 | B2* | 2/2010 | Kouda | F16L 37/23 285/318 |
| 8,205,914 | B2* | 6/2012 | Chappaz | F16L 37/32 285/276 |
| 9,958,101 | B2* | 5/2018 | Gennasio | F16L 37/34 |
| 11,428,359 | B2* | 8/2022 | Tiberghien | F16L 37/22 |
| 11,486,528 | B2* | 11/2022 | Nick | F16L 37/23 |
| 11,530,768 | B2* | 12/2022 | Wada | F16L 37/32 |
| 12,253,199 | B2* | 3/2025 | Gong | H05K 7/20818 |
| 2023/0213128 | A1* | 7/2023 | Kuo | F16L 37/38 285/305 |
| 2025/0020253 | A1* | 1/2025 | Pollet | F16L 37/23 |

FOREIGN PATENT DOCUMENTS

| | | | |
|---|---|---|---|
| CN | 215060325 U | 12/2021 | |
| DE | 4114480 A1 * | 11/1991 | ............. F16L 37/34 |
| DE | 102006022285 A1 * | 11/2007 | ............. F16L 37/23 |
| SE | 465793 B * | 10/1991 | ............. F16L 37/60 |
| TW | M658956 U | 8/2024 | |
| WO | WO-9719289 A1 * | 5/1997 | ............. F16L 37/28 |
| WO | WO-2013042424 A1 * | 3/2013 | ............. F16L 37/34 |

* cited by examiner

QUICK COUPLER

This application claims the priority benefit of Taiwan patent application number 113117458 filed on May 10, 2024, the disclosure of which is hereby incorporated by reference in its entirety.

FIELD OF THE INVENTION

The present invention relates to a quick coupler, and more particularly, to a quick coupler including a male and a female part that are self unlocking from a connected state and provide firm and stable connection once being engaged.

BACKGROUND OF THE INVENTION

Quick couplers are often used in liquid or gas transportation systems. Presently, most of the available quick couplers include a male part and a female part that are respectively connected to a pipe and can be quickly engaged with or disengaged from each other. The male and the female part of the quick coupler are fixedly held to each other commonly using steel balls.

Currently, there is only one row of steel balls provided on the quick coupler for locking the male and the female part to each other. To unlock the male and female parts from each other, a collar on the female part must be manually moved rearward to release the steel balls. Since the unlocking involves only one relatively short stroke, the connection between the male and the female part is not always firm and stable and is subjected to the risk of becoming loosened. The collar on the female part presses the steel balls against spherical dents formed on the male part to achieve the purpose of locking the male and the female part together. The collar tends to displace, loosen and even self unlock when it has a large manufacturing tolerance or is subjected to fierce vibration, and the collar in these states could no longer press the steel balls against the spherical dents on the male part to lead to separated, loosened, or stuck male and female part of the quick coupler.

It is therefore tried by the inventor to develop an improved quick coupler that overcomes the problems in the conventional quick coupler, such as being easily disconnected, loosened, or self-unlocked after the male and female coupling parts are joined.

SUMMARY OF THE INVENTION

To effectively solve the above problems, a primary object of the present invention is to provide a quick coupler, which includes a male and a female part having a plurality of first and second steel balls circumferentially alternated and axially staggered between them, and an outer sliding sleeve externally fitted around the female part for pressing the steel balls in place to firmly lock the male and the female part together while allowing the male and female parts to self unlock from each other simply by pushing the male part toward the female part.

To achieve the above and other objects, the quick coupler of the present invention includes a male part and a female part. The male part includes a male part main body internally defining a first passage, in which a male valve core and a first spring are disposed. The male valve core is located in a front end of the male part main body and the first spring is located between the male valve core and the male part main body with two ends elastically pressed against them. The male part main body is externally provided with a radially outward protruded portion, which has a slanted push surface and a chamfered locating surface facing forward and rearward, respectively, relative to the male part main body.

The female part includes a front female case, a rear female case, and an outer sliding sleeve. The front female case is provided with a plurality of first through holes and a plurality of second through holes, which are circumferentially alternated and axially staggered on a front circumferential surface of the front female case for receiving first steel balls and second steel balls therein, respectively, such that the first steel balls are located axially in front of the second steel balls. The front female case further has a second spring externally fitted around it. The front and the rear female case are connected together to internally define a second passage communicable with the first and second through holes. The second passage having a movable valve core, a fixed core shaft, and a third spring disposed therein. The fixed core shaft is connected to the rear female case, the movable valve core is movably fitted around an outer side of the fixed core shaft, and the third spring is fitted between and has two ends elastically pressed against the movable valve core and a bottom of the fixed core shaft. The outer sliding sleeve is slidably fitted on an outer side of the front female case and the second spring. When the male part is connected to the female part, the slanted pushing surface of the radially protruded portion on the male part main body pushes against the first steel balls and the second steel balls on the female part sequentially to thereby drive the outer sliding sleeve toward the rear female case by a first stroke and a second stroke in sequence. When the first steel balls are pushed by the slanted pushing surface to move across the protruded portion to abut on the chamfered locating surface, the outer sliding sleeve is elastically pushed by the second spring to an original position for pressing the first steel balls down to a locked position, such that the male and the female part are connected together and the first passage is communicable with the second passage.

By provision the radially outward protruded portion on the male part and the axially staggered first and second steel balls around the front section of the female part, the male and the female part can be firmly and stably locked together via the staggered first and second steel balls. And, the outer sliding sleeve is self unlocked in the process of connecting the male part to the female part.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE
PREFERRED EMBODIMENTS

The present invention will now be described with a preferred embodiment thereof.

Figure 1A:
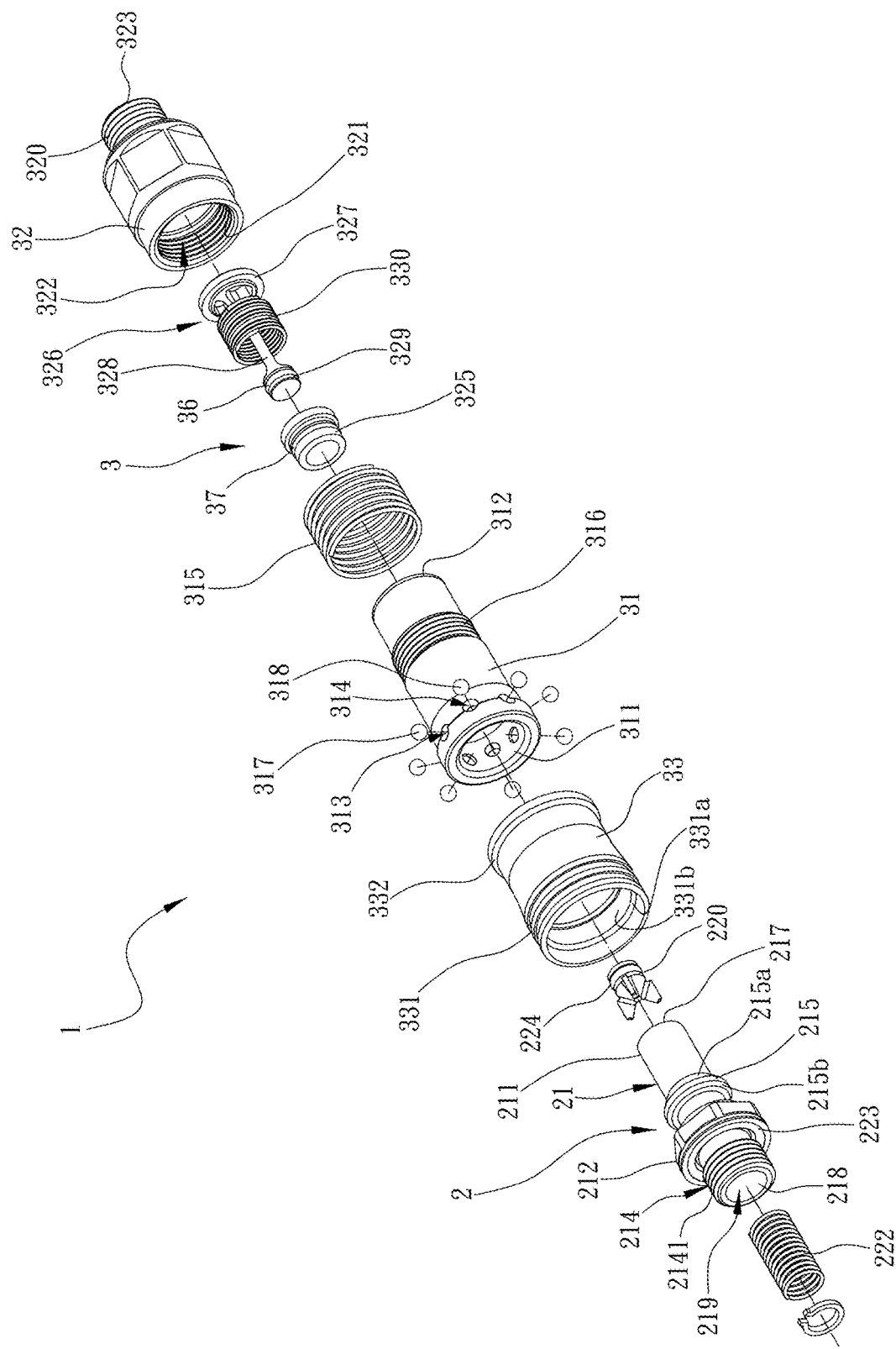
FIG. 1A is an exploded perspective view of a quick coupler according to a preferred embodiment of the present invention viewed from a first direction.
Figure 1B:
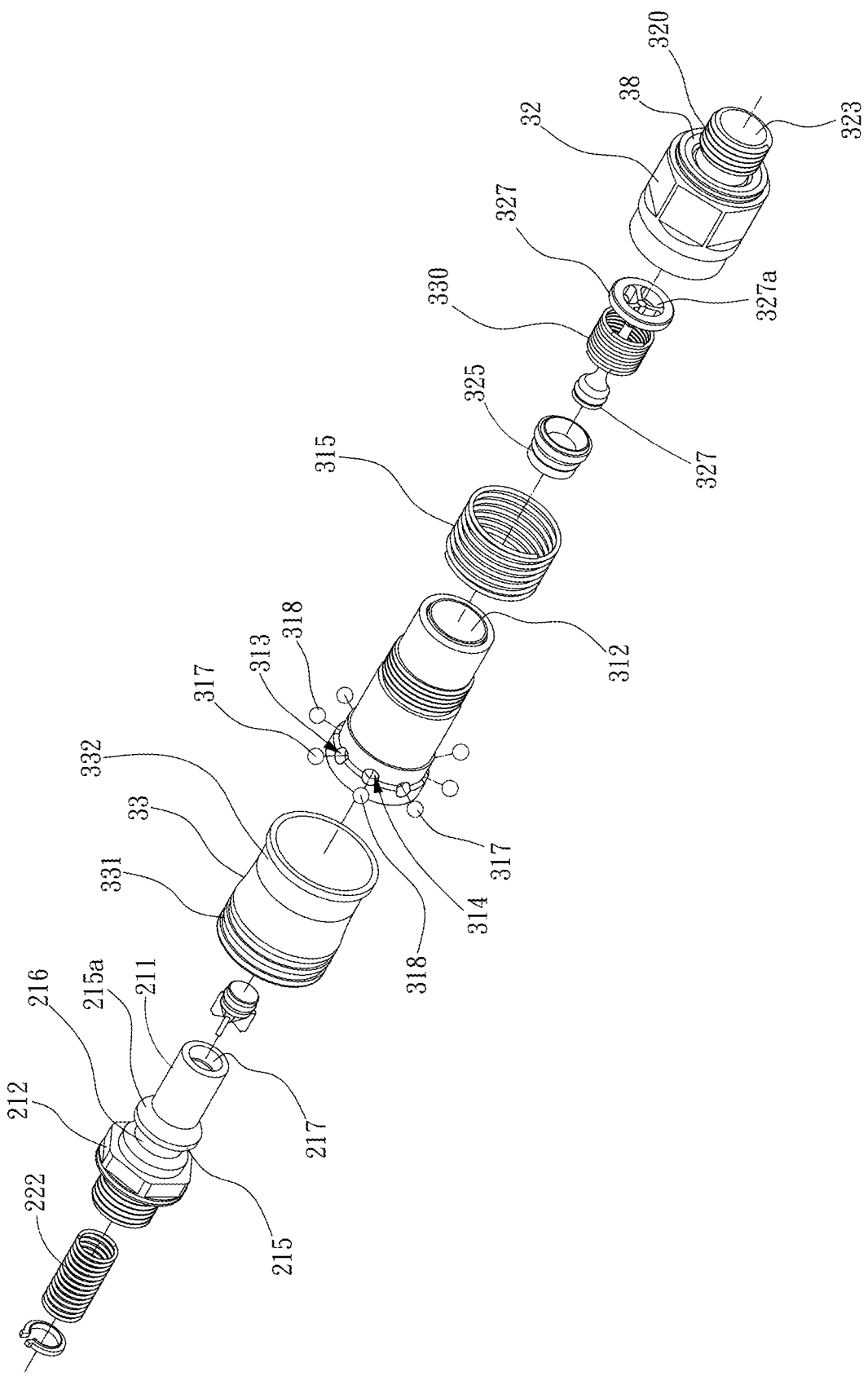
FIG. 1B is another exploded perspective view of the quick coupler according to the preferred embodiment of the present invention viewed from a second direction.
Figure 2A:
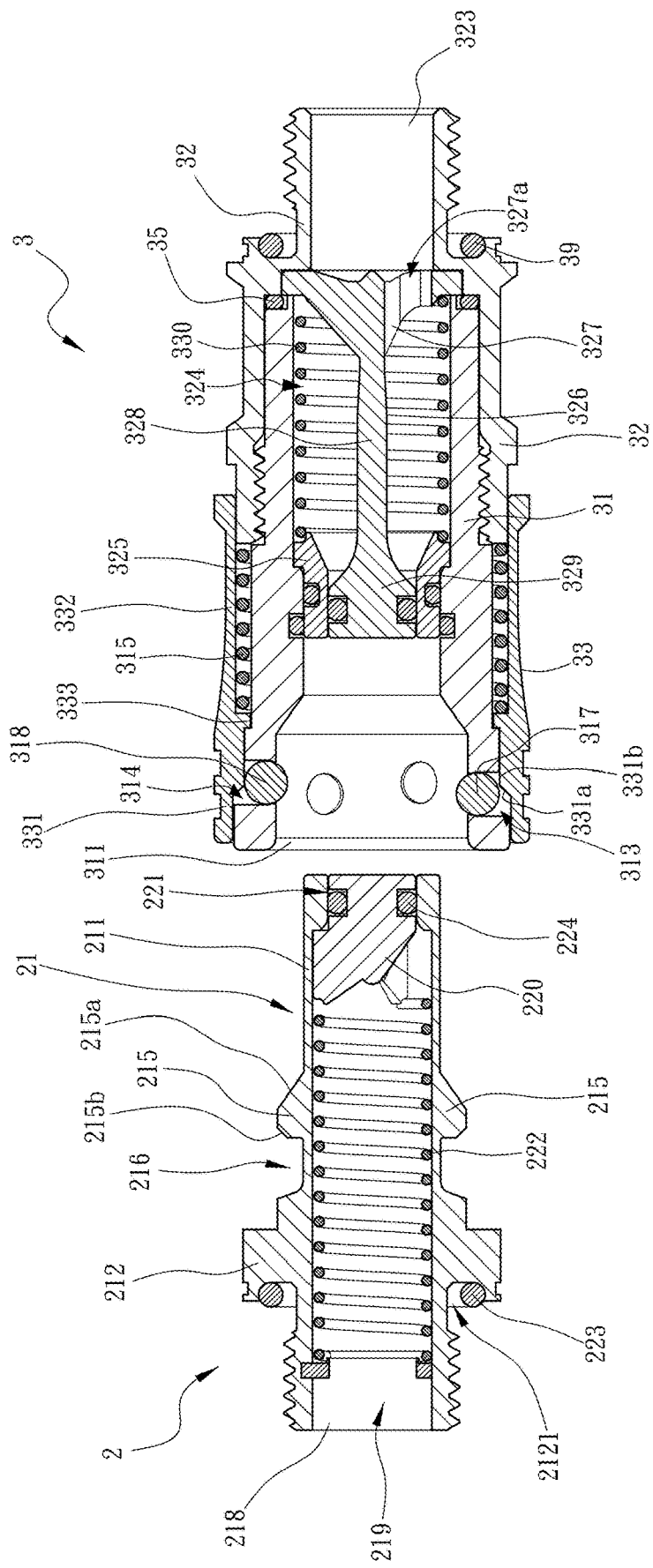
FIG. 2A is an exploded sectional side view showing a male and a female part of the quick coupler according to the preferred embodiment of the present invention before they are connected to each other.

Please refer to FIGS. 1A, 1B, and 2A. A quick coupler 1 according to the present invention may be used in water cooling system and gas or hydraulic pipeline system, and includes a male part 2 and a female part 3. In the illustrated embodiment, ends of the male part 2 and the female part 3 that are correspondingly connected to each other are defined as front ends, and another opposite end of the male and the female part 2, 3 are defined as rear ends.

The male part 2 include a male part main body 21 having a plug section 211, a male seat portion 212, and a male connecting section 214. The plug section 211 and the male connecting section 214 are protruded from a front and a rear side of the male seat portion 212, respectively. The male part main body 21 is provided around an outer surface of the plug section 211 with a radially protruded portion 215, which includes a front slanted pushing surface 215a and a rear chamfered locating surface 215b. More specifically, the pushing surface 215a and the locating surface 215b start from a flat top surface of the protruded portion 215 to decline toward the front end and the rear end of the male part main body 21, respectively. It is noted the pushing surface 215a and the locating surface 215b decline in different directions.

The male connecting section 214 is externally provided with a plurality of male threads 2141 for meshing with corresponding female threads provided on a gas or liquid pipe (not shown). A front side of the male seat portion 212 and the protruded portion 215 have a recessed portion 216 defined between them, and a rear side of the male seat portion 212 is provided with a first annular groove 2121. The first annular groove 2121 is provided for receiving a first sealing element 223 therein to ensure leakproof connection between the male part 2 and the gas or liquid pipe.

Please refer to FIGS. 1A, 1B, 2A, and 2B. A front and a rear end of the male part main body 21 are a first opening 217 and a first connection port 218, respectively. The first connection port 218 is provided for fluidly communicating with a pipe member (not shown). The male part main body 21 internally defines a first passage 219 extended between and communicable with the first opening 217 and the first connection port 218. The first passage 219 is internally provided with a male valve core 220 and a first spring 222. The male valve core 220 is located in the first opening 217 at the front end of the male part main body 21, and is externally provided with a second annular groove 221 for receiving a second sealing element 224 therein to ensure leakproof connection between the male valve core 220 and an inner wall surface of the male part main body 21. The first spring 222 is located between and has two ends elastically pressed against the male valve core 222 and the rear end of the male part main body 21. The first spring 222 provides an elastic support for the male valve core 222 to reciprocatingly move linearly (i.e. move axially forward and rearward) in the first passage 219.

The female part 3 includes a front female case 31, a rear female case 32, and an outer sliding sleeve 33. The front female case 31 has a front and a rear end defining a second opening 311 and a third opening 312, respectively. The front female case 31 is provided with a plurality of first through holes 313 and a plurality of second through holes 314. The first and the second through holes 313, 314 are alternated and staggered along a front circumferential surface of the front female case 31 to form a front and a rear row of through holes 313, 314. That is, the first through holes 313 and the second through holes 314 are formed on the front circumferential surface of the front female case 31 in two axially spaced circular rows. In the illustrated embodiment, the first through holes 313 are located in front of the second through holes 314 on the front female case 31 closer to the second opening 311 of the front female case 31; and the second through holes 314 and the first through holes 313 are not axially aligned with one another.

Each of the first and the second through holes 313, 314 respectively have a first and a second steel ball 317, 318 disposed therein, such that first and the second steel balls 317, 318 are arrayed in two circular rows on the front circumferential surface of the front female case 31 and axially staggered from each other. With this arrangement, the outer sliding sleeve 33 is unlocked from the female part 3 in two steps, a force for unlocking the outer sliding sleeve 33 from the female part 3 can be transmitted efficiently, and a lengthened unlocking stroke can be ensured. The front female case 31 is externally provided with a second spring 315 and a plurality of male threads 316. The second spring 315 is fitted on an outer surface of the front female case 31 between the second steel balls 318 and the male threads 316.

The rear female case 32 is provided at a front end with an engaging opening 322 having female threads 321 for correspondingly engaging with the male threads 316 on a rear section of the front female case 31, and provided at a rear end with a second connection port 323 externally provided with male threads 320 for meshing with female threads provided in another pipe of a gas or liquid pipeline system (not shown), such that front female case 31 and the rear female case 32 are connected to form an integral body to define a second passage 324 therein. The second passage 324 is communicable with the second and third openings 311, 312 of the front female case 31, the second connection port 323, and the first and second through holes 313, 314.

The rear end of the front female case 31 and an inner bottom surface of the rear female case 32 have a third sealing element 35 provided between them to ensure liquid or gas leak tightness thereat. Further, the rear female case 32 has a third annular groove 341 formed on a rear side thereof for a seventh sealing element 39 to fit therein. The seventh sealing element 39 ensures a leakproof connection between the rear female case 32 and another gas or liquid pipe.

Figure 2B:
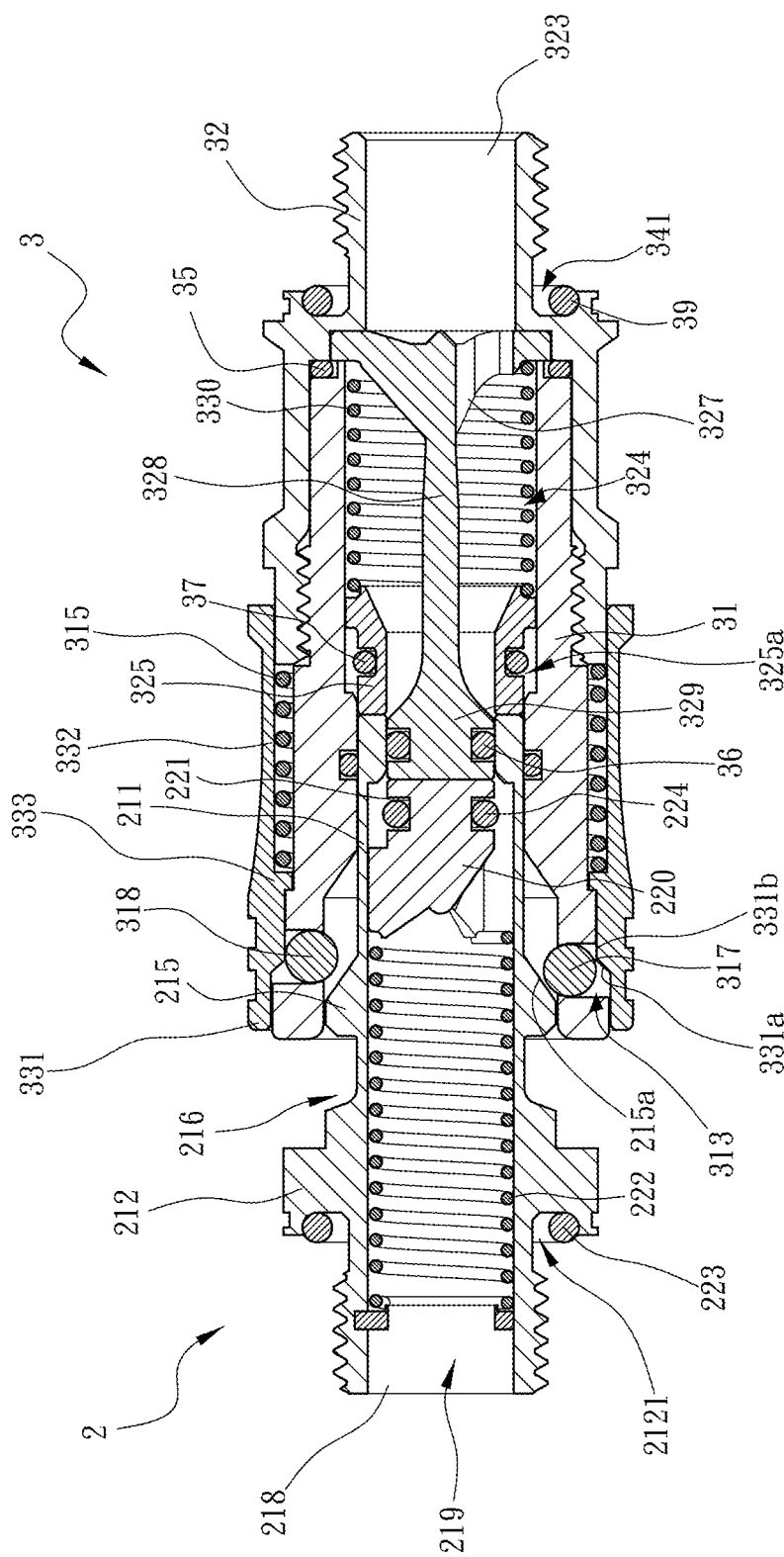
FIG. 2B is assembled view of FIG. 2A showing the male part is initially plugged into the female part.

Please refer to FIGS. 1A, 2A, and 2B. The second passage 324 has a movable valve core 325, a fixed core shaft 326 and a third spring 330 disposed therein. The fixed core shaft 326 includes a base portion 327, a shank portion 328, and a head portion 329. The core head portion 329 and the core base portion 327 are connected to a front and a rear end of the shank portion 328, respectively. The core base portion 327 is fixed to an inner bottom surface of the rear female case 32 and is provided with a plurality of axial through holes 327a that axially penetrate the core base portion 327 to communicate the second passage 324 with the second connection port 323. The core head portion 329 is located in the second passage 324 near a middle section of the front female case 31 and is externally provided with a first groove 329a for receiving a fourth sealing element 36 therein. The fourth sealing element 36 ensures leakproof connection between the core head portion 329 of the fixed core shaft 326 and the movable valve core 325.

The third spring 330 is fitted on the core shank portion 328 between the core base portion 327 and the movable valve core 325 with two ends elastically pressed against the core base portion 327 and the movable valve core 325. The movable valve core 325 is movably fitted around an outer side of the fixing core shaft 326 to provide an elastic supporting force for the movable valve core 325 to move linearly (i.e. axially forward and rearward) in a reciprocating motion in the second passage 324. Further, the movable valve core 325 is externally provided with a second groove 325a for receiving a fifth sealing element 37 therein. The fifth sealing element 37 is located between the movable valve core 325 and an inner wall surface of the front female case 31 to ensure a leakproof connection thereat. The front female case 31 is further provided on the inner wall surface near a front section thereof with a third groove 319 for receiving a sixth sealing element 38. The sixth sealing element 38 is located between the movable valve core 325 and the inner wall surface of the front female case 31 therein to ensure a leakproof connection between the plug section 211 of the male part 2 and the female part 3, such that any risk of leaking is prevented in the process of connecting and unlocking the male and the female part 2, 3 to and from each other.

Please refer to FIGS. 1A, 2A, and 2B. The outer sliding sleeve 33 of the female part 3 is slidably fitted on an outer side of the front female case 31 and the second spring 315. The outer sliding sleeve 33 has two open ends and is divided into a front section 331 and a rear section 332. The front section 331 is internally provided with a slanted driven surface 331a and a flat abutting surface 331b. The driven surface 331a formed on an inner surface of the front section 331 of the outer sliding sleeve 33 is tapered toward the rear section 332 of the outer sliding sleeve 33 to connect with the flat abutting surface 331b. Before the female part 3 is connected to the male part 2, the driven surface 331a and the flat abutting surface 331b of the outer sliding sleeve 33 of the female part 3 are in contact with and pressed against the first steel balls 317 and the second steel balls 318, respectively. The outer sliding sleeve 33 further includes a limiting section 333 formed on the inner surface thereof between the front and the rear section 331, 332. The second spring 315 is limited between the limiting section 333 and the front end of the rear female case 32 with two ends of the second spring 315 elastically pressed against them. An elastic force of the second spring 315 pushes the outer sliding sleeve 33 forward to radially inward press against the first and second steel balls 317, 318, such that the first and second steel balls 317, 318 are limited from moving.

Figure 2C:
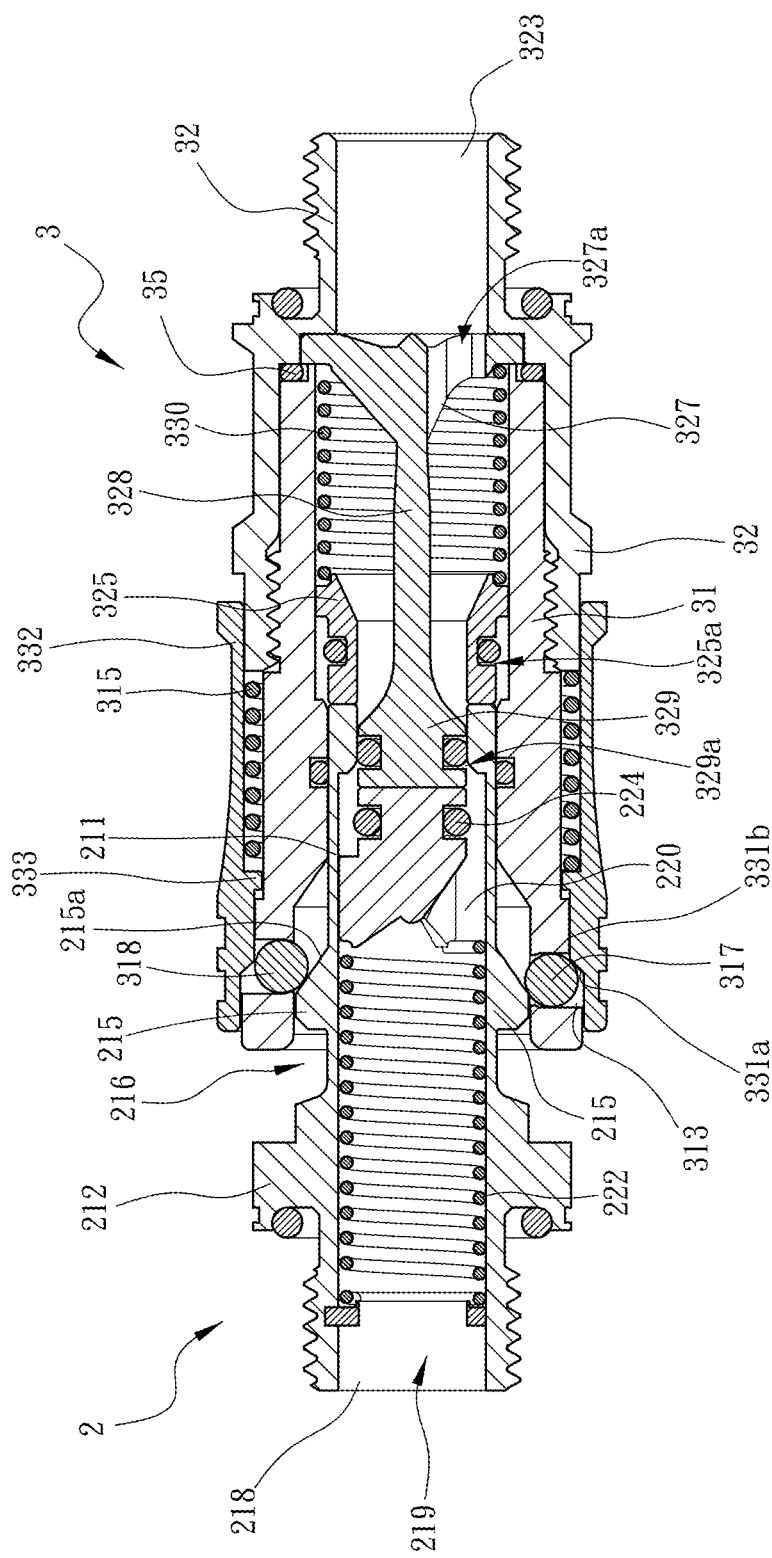
FIG. 2C shows the male part pushes against first steel balls on the female part to displace an outer sliding sleeve of the female part by a first stroke.
Figure 2D:
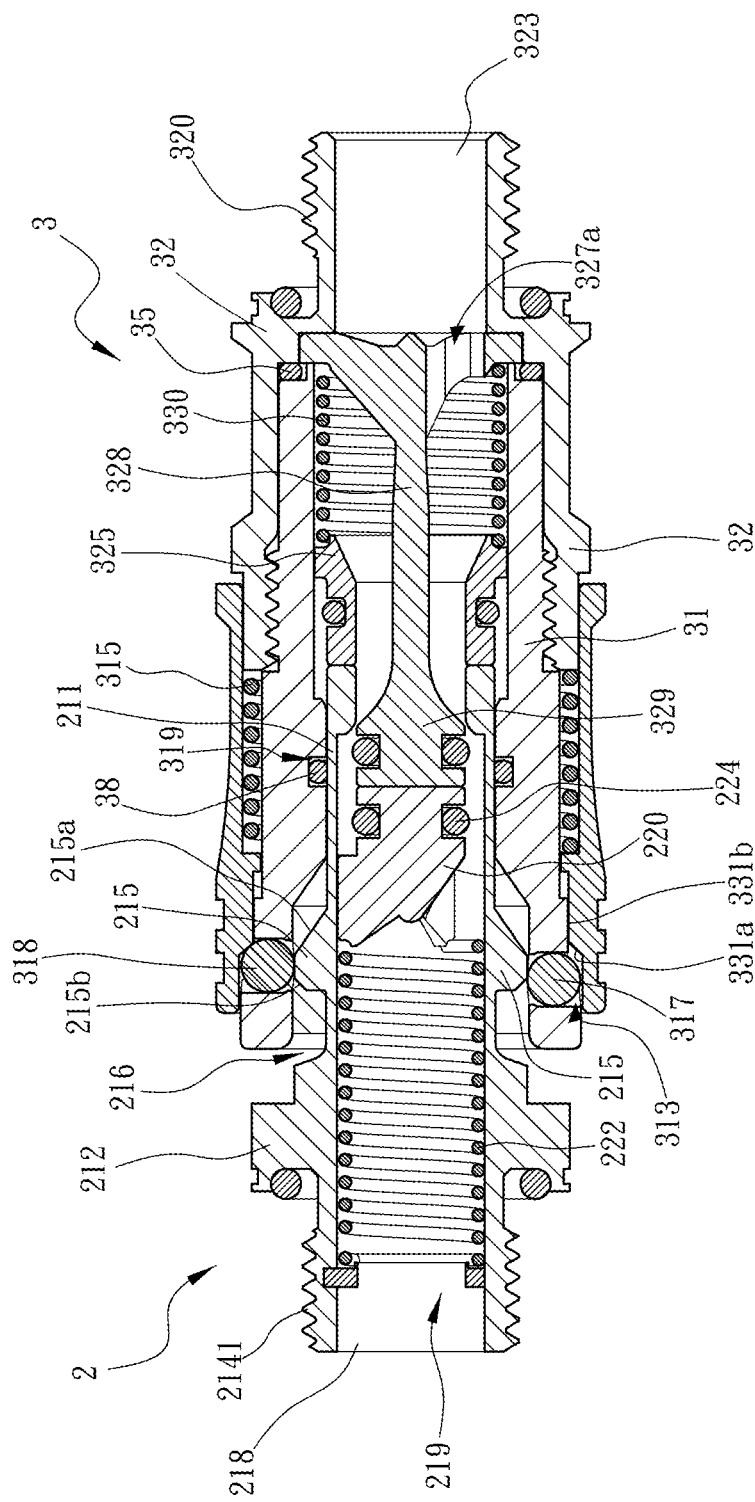
FIG. 2D shows the male part pushes against second steel balls on the female part to displace the outer sliding sleeve of the female part by a second stroke.
Figure 2E:
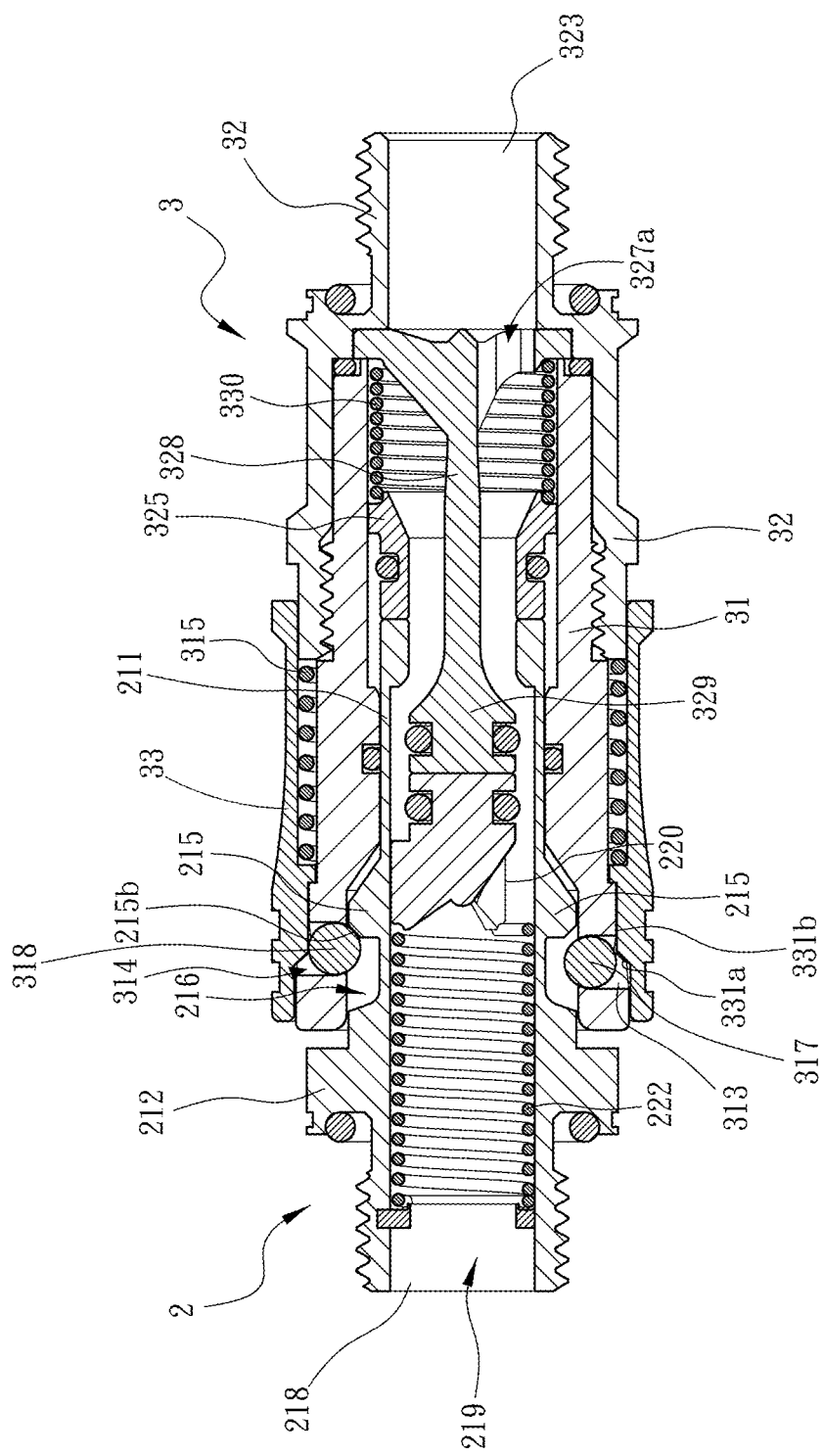
FIG. 2E shows the male and the female part are fully connected and locked to each other.

Please refer to FIGS. 1A and 2A to 2E. To connect the male part 2 to the female part 3, first apply a force to plug the plug section 211 of the male part 2 into the second opening 311 of the female part 3, as shown in FIG. 2A, such that the plug section 211 and the male valve core 220 get in touch with the movable valve core 325 and the core head portion 329 of the fixed core shaft 326 in the female part 3, respectively, as shown in FIG. 2B. At this point, the plug section 211 pushes the movable valve core 325 toward the second connection port 323, and the male valve core 220 of the male part 2 is stopped by the fixed core shaft 326 of the female part 3 to move rearward toward the first connection port 218. During the process of plugging the plug section 211 into the female part 3, the slanted pushing surface 215a of the radially protruded portion 215 on the male part 2 would first contact with and push against the first steel balls 317 on the front female case 31, and the first steel balls 317 transmit the push force from the male part 2 to the slanted driven surface 331a of the outer sliding sleeve 33, driving the outer sliding sleeve 33 to move toward the rear female case 32 by a first stroke to complete a first stage of unlocking, as shown in FIG. 2C. Then, the slanted pushing surface 215a of the male part 2 further contacts with and pushes against the second steel balls 318 on the front female case 31, and the push force is transmitted from the second steel balls 318 to the slanted driven surface 331a, driving the outer sliding sleeve 33 to move toward the rear female case 32 by a second stroke to complete a second stage of unlocking, as shown in FIG. 2D. In the temporarily unlocked state, the first and second steel balls 317, 318 are moved into the recessed portion 216 on the male part 2, and the outer sliding sleeve 33 is pushed by an elastic restoring force of the second spring 315 to its original position to press the first steel balls 317 against the chamfered locating surface 215b of the male part 2 to be set in a locked position, as shown in FIG. 2E, such that the male part 2 and the female part 3 are connected together and the first and the second passage 219, 324 are communicable with each other.

In the illustrate preferred embodiment, the rear female case 32 and the front female case 31 are assembled through engagement of the female threads 321 on the rear female case 32 with the male threads 316 on the front female case 31. It is understood the present invention is not necessarily limited to the above embodiment. In some other embodiments, the front female case 31 and the rear female case 32 can be assembled together by snap joint or other means.

In the present invention, the radially protruded portion 215 on the male part 2 and the two circumferential rows of alternated and staggered first and second steel balls 317, 318 provided on the female part 3 cooperate with one another to provide two-stage and lengthened unlocking strokes, which not only enhances the push force transmission efficiency of the first and second steel balls 317, 318 to unlock the outer sliding sleeve 33 from the front female case 31, but also ensures firm and stable connection of the male and the female part 2, 3 when the outer sliding sleeve 33 is located at the locked position. Therefore, the risk of undesired self unlocking and loosening of the female part 3 from the male part 2 due to large part manufacturing tolerance or fierce vibration can be avoided. Further, in the present invention, the male part 2 can be directly plugged into the female part 3 for the radially protruded portion 215 of the male part 2 to push against the first and second steel balls 317, 318 on the female part 3 to drive the outer sliding sleeve 33 backward and achieve automatic unlocking of the male part 2 from the female part 3. That is, with the present invention, the female part 3 of the quick coupler 1 can be connected to the male part 2 without the need of manually applying a force to push the outer sliding sleeve 33 of the female part 3. Therefore, the male and female parts 2, 3 of the quick coupler 1 of the present invention can be smoothly and conveniently connected with only one hand.

The present invention has been described with a preferred embodiment thereof and it is understood that many changes and modifications in the described embodiment can be carried out without departing from the scope and the spirit of the invention that is intended to be limited only by the appended claims.

What is claimed is:

1. A quick coupler comprising:
    a male part including a male part main body internally defining a first passage having a male valve core and a first spring disposed therein; the male valve core being located in a front end of the male part main body and the first spring being located between and having two ends elastically pressed against the male valve core and a rear inner end of the male part main body; the male part main body being externally provided with a radially outward protruded portion, which has a slanted pushing surface and a chamfered locating surface facing forward and rearward, respectively, relative to the male part main body; and a female part including a front female case, a rear female case, and an outer sliding sleeve; the front female case being provided with a plurality of first through holes and a plurality of second through holes, which are circumferentially alternated and axially staggered on a front circumferential surface of the front female case for receiving first steel balls and second steel balls therein, respectively, such that the first steel balls are located axially in front of the second steel balls; and the front female case further having a second spring externally fitted around it; the front and the rear female case being connected together to internally define a second passage communicable with the first and second through holes; the second passage having a movable valve core, a fixed core shaft, and a third spring disposed therein; the fixed core shaft being connected to the rear female case, the movable valve core being movably fitted around an outer side of the fixed core shaft, and the third spring being fitted between and having two ends elastically pressed against the movable valve core and a bottom of the fixed core shaft; and the outer sliding sleeve being slidably fitted on an outer side of the front female case and the second spring; and wherein when the male part is connected to the female part, the slanted pushing surface of the radially protruded portion on the male part main body pushes against the first steel balls and the second steel balls on the female part sequentially to thereby drive the outer sliding sleeve toward the rear female case by a first stroke and a second stroke in sequence; and when the second steel balls are pushed by the slanted pushing surface to move across the protruded portion to abut on the chamfered locating surface, the outer sliding sleeve is elastically pushed by the second spring to an original position for pressing the second steel balls down to a locked position, such that the male and the female part are connected together and the first passage is communicable with the second passage.

2. The quick coupler as claimed in claim 1, wherein the male part includes a plug section and a male connecting section located at a front and a rear section of the male part main body, respectively, and a male seat portion located at a middle section of the male part main body; the male seat portion being provided at a rear end with an annular groove for receiving a first sealing element therein; and a recessed portion being formed between a front side of the male seat portion and the protruded portion capable of receiving the first and the second steel balls therein.

3. The quick coupler as claimed in claim 1, wherein the outer sliding sleeve has two open ends and is divided into a front section and a rear section; the front section internally including a slanted driven surface and a flat abutting surface; the slanted driven surface being tapered toward and connected to the flat abutting surface, and the first and the second steel balls being in contact with and pressed against the slanted driven surface and the flat abutting surface, respectively; a limiting section being formed on the inner surface of the outer sliding sleeve between the front and the rear section, and the second spring being located between and having two ends elastically pressed against the limiting section and a front end of the rear female case.

4. The quick coupler as claimed in claim 1, wherein the male part main body has a front and a rear end being a first opening and a first connection port, respectively, and the first connection port and the first opening being communicable with the first passage; and the male valve core being received in the first opening and being provided on an outer surface with a second annular groove for receiving a second sealing element therein.

5. The quick coupler as claimed in claim 1, wherein the front female case is externally provided with a plurality of male threads and the rear female case is internally provided with a plurality of female threads; the front and the rear female case being screwed together through engagement of the male threads with the female threads thereof; and a third sealing element being fitted between a rear end of the front female case and an inner bottom of the rear female case to ensure a leakproof connection thereat.

6. The quick coupler as claimed in claim 1, wherein the fixed core shaft and the movable valve core are externally provided with a first groove and a second groove, respectively, and the front female case is provided at a front portion on an inner wall surface with a third groove; the first, the second and the third groove having a fourth, a fifth, and a sixth sealing element received therein, respectively; the fourth sealing element being fitted between the fixed core shaft and the movable valve core to ensure leakproof connection thereat, and the fifth and the sixth sealing element being fitted between the movable valve core and the inner wall surface of the front female case to ensure leakproof connection thereat.

7. The quick coupler as claimed in claim 1, wherein the first and the second through holes are formed circumferentially on the front female case and arrayed into two axially spaced circular rows.

* * * * *